(12) United States Patent
Pruss

(10) Patent No.: US 10,683,791 B2
(45) Date of Patent: Jun. 16, 2020

(54) EXHAUST GAS PURIFICATION SYSTEM

(71) Applicant: Bayerische Motoren Werke Aktiengesellschaft, Munich (DE)

(72) Inventor: Markus Pruss, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/100,786

(22) Filed: Aug. 10, 2018

(65) Prior Publication Data

US 2018/0347438 A1 Dec. 6, 2018

Related U.S. Application Data

(63) Continuation of application No. PCT/EP2017/052610, filed on Feb. 7, 2017.

(30) Foreign Application Priority Data

Feb. 12, 2016 (DE) .................. 10 2016 202 142

(51) Int. Cl.
*F01N 13/00* (2010.01)
*F01N 3/28* (2006.01)
(Continued)

(52) U.S. Cl.
CPC ........... *F01N 13/017* (2014.06); *F01N 3/021* (2013.01); *F01N 3/2885* (2013.01);
(Continued)

(58) Field of Classification Search
None
See application file for complete search history.

(56) References Cited

U.S. PATENT DOCUMENTS

| 4,625,511 A | 12/1986 | Scheitlin et al. |
| RE33,118 E * | 11/1989 | Scheitlin ............... F01N 3/0211 60/299 |

(Continued)

FOREIGN PATENT DOCUMENTS

| CN | 104321507 A | 1/2015 |
| DE | 24 17 435 A1 | 10/1975 |

(Continued)

OTHER PUBLICATIONS

PCT/EP2017/052610, International Search Report dated Apr. 5, 2017 (Two (2) pages).

(Continued)

*Primary Examiner* — Walter D. Griffin
*Assistant Examiner* — Jelitza M Perez
(74) *Attorney, Agent, or Firm* — Crowell & Moring LLP

(57) ABSTRACT

An exhaust gas purification system has a first exhaust gas purification element, a second exhaust gas purification element, a first exhaust gas part flow duct, and a second exhaust gas part flow duct. The second exhaust gas purification element is arranged geometrically after the first exhaust gas purification element. The first exhaust gas part flow duct has a first exhaust gas passage area and the second exhaust gas part flow duct has a second exhaust gas passage area. The exhaust gas passage areas are aligned parallel to a projection plane and the first and second exhaust gas part flow ducts are arranged geometrically one after another. The two exhaust gas part flow ducts are arranged such that a partial flow channel axis that is orthogonal to the projection plane passes through the first and second exhaust gas passage areas.

15 Claims, 2 Drawing Sheets

(51) Int. Cl.
*F01N 13/18* (2010.01)
*F01N 3/021* (2006.01)

(52) U.S. Cl.
CPC ....... *F01N 3/2892* (2013.01); *F01N 13/1872* (2013.01); *Y02A 50/2322* (2018.01); *Y02T 10/20* (2013.01)

(56) References Cited

U.S. PATENT DOCUMENTS

| | | |
|---|---|---|
| 6,464,744 B2 | 10/2002 | Cutler et al. |
| 2002/0073666 A1 | 6/2002 | Cutler et al. |
| 2003/0051449 A1 | 3/2003 | Nishiyama et al. |

FOREIGN PATENT DOCUMENTS

| | | |
|---|---|---|
| DE | 103 29 436 A1 | 1/2005 |
| EP | 2 440 758 B1 | 4/2012 |
| GB | 2471001 A | 12/2010 |

OTHER PUBLICATIONS

German Office Action issued in German counterpart application No. 10 2016 202 142.7 dated Oct. 19, 2016 (Three (3) pages).
Chinese Office Action issued in Chinese counterpart application No. 201780004023.1 dated Sep. 29, 2019, with English translation (Sixteen (16) pages).

\* cited by examiner

EXHAUST GAS PURIFICATION SYSTEM

CROSS REFERENCE TO RELATED APPLICATIONS

This application is a continuation of PCT International Application No. PCT/EP2017/052610, filed Feb. 7, 2017, which claims priority under 35 U.S.C. § 119 from German Patent Application No. 10 2016 202 142.7, filed Feb. 12, 2016, the entire disclosures of which are herein expressly incorporated by reference.

BACKGROUND AND SUMMARY OF THE INVENTION

The invention relates to an exhaust gas purification system. Exhaust gas purification systems of this type are known from the prior art, in particular from DE 103 29 436 A1.

In the following text, the invention will be described using an exhaust gas purification system in a passenger motor vehicle with a gasoline engine; this is not to be understood as a restriction of the invention to an embodiment of this type.

During the combustion of fuel for driving a passenger motor vehicle, exhaust gases are produced which are purified before they pass into the environment. Catalytic converters, in which chemical conversion processes take place, and filter systems, in which the quantity of particulates in the exhaust gas is reduced, are known for the purification of the exhaust gases. A common feature of the two purification systems in that their action is improved if the contact area between the exhaust gas and the purification system is increased; in addition, a lower exhaust gas back pressure can be achieved by way of a large contact area, which lower exhaust gas back pressure has a positive effect on the efficiency of the internal combustion engine.

For mobile applications such as in passenger motor vehicles, however, the compactness of a component is also always important. For improved installation space utilization for an exhaust gas purification system in a passenger motor vehicle, DE 103 29 436 A1 proposes arranging two exhaust gas purification elements geometrically behind one another and designing the exhaust gas routing in such a way that the exhaust gas of the internal combustion engine can flow through the exhaust gas purification elements in parallel.

It is an object of the invention to specify an exhaust gas purification system which has a low installation space requirement and a high efficiency.

Within the context of the invention, an exhaust gas purification system is a device for purifying exhaust gases from an internal combustion engine as can be used for driving a motor vehicle. The internal combustion engine is preferably of reciprocating piston design, and the internal combustion engine is further preferably configured as an internal combustion engine which operates in accordance with the diesel principle or preferably in accordance with the gasoline principle.

Within the context of the invention, an exhaust gas purification element is to be understood to mean a device, through which an exhaust gas flow can flow, and the exhaust gas flow can make contact here at least in sections with the exhaust gas purification element or a surface of the exhaust gas purification element. Furthermore, during the through flow, the exhaust gas purification element cleans certain, in particular noxious, constituents from the exhaust gas, or converts them into harmless constituents. Furthermore, an exhaust gas purification element preferably makes it possible to filter solid bodies, or particles, from the exhaust gas low. Exhaust gas purification elements of this type are known from the prior art, in particular as components which consist at least in sections of ceramic or metallic materials or are coated with them at least in sections. In particular, an exhaust gas purification element of this type is called a monolith.

Within the context of the invention, the exhaust gas purification system is configured in such a way that the at least two part exhaust gas flows are configured, that is to say therefore that an exhaust gas flow which can be fed from the internal combustion engine to the exhaust gas purification system is divided into two exhaust gas flows which flow in parallel in flow terms, and the two part exhaust gas flows are combined again to form a common exhaust gas flow, preferably before leaving the exhaust gas purification system. Lowering of the flow resistance for the exhaust gas purification system can be achieved, in particular, by way of the division into part exhaust gas flows.

Within the context of the invention, the exhaust gas outlet area of an exhaust gas purification element is to be understood to mean that area of the exhaust gas purification element, through which the part exhaust gas flow which flows through the exhaust gas purification element leaves the latter. Visually, in particular in the case of a cylindrical exhaust gas purification element, through which exhaust gas can flow along a cylinder axis, the rear (in flow terms) covering area of the cylinder is to be understood to be the exhaust gas outlet area.

Accordingly, the exhaust gas inlet area of an exhaust gas purification element is to be understood to mean that area of the exhaust gas purification element, through which the part exhaust gas flow which flows through the exhaust gas purification element enters into the latter. Visually, in particular in the case of a cylindrical exhaust gas purification element, through which exhaust gas can flow along a cylinder axis, the front (in flow terms) covering area of the cylinder is to be understood to be the exhaust gas inlet area.

Within the context of the invention, an exhaust gas part flow duct is to be understood to mean a flow duct which is connected in flow terms in parallel with one of the exhaust gas purification elements. In particular, an exhaust gas part flow duct of this type makes it possible that the exhaust gas flow which can be output by the internal combustion engine is divided within the exhaust gas purification system into a first and a second part exhaust gas flow, the first part exhaust gas flow flowing through the first exhaust gas purification element and the second part exhaust gas flow flowing through the first exhaust gas part flow duct; this applies accordingly to the second exhaust gas part flow duct and the second exhaust gas purification element. An exhaust gas part flow duct of this type is preferably configured as a pipeline. An exhaust gas part flow duct of this type is preferably configured within a housing which surrounds at least one of the exhaust gas purification elements at least partially, and the exhaust gas part flow duct is preferably delimited at least in sections by way of the housing. In particular, a particularly space-saving construction is made possible by way of a configuration of this type of one of the exhaust gas part flow ducts or of the two exhaust gas part flow ducts.

Within the context of the invention, a projection plane is to be understood to mean an imaginary plane which is preferably arranged orthogonally with respect to the through flow direction of at least the first or the second or the two exhaust gas purification elements. A longitudinal axis of at least one of the exhaust gas purification elements is further preferably oriented orthogonally with respect to the projection plane, or axially parallel to the through flow direction of the part exhaust gas flow through at least one of the exhaust gas purification elements. At least one of the exhaust gas purification elements is further preferably configured in a rotationally symmetrical manner with respect to the longitudinal axis of the exhaust gas purification element. The projection plane is further preferably oriented orthogonally with respect to the flow direction which the part exhaust gas flow has directly during or after the exit from one of the exhaust gas purification elements, preferably the first exhaust gas purification element.

The first exhaust gas part flow duct is preferably arranged geometrically at least in sections next to the first exhaust gas purification element, and the second exhaust gas part flow duct is arranged geometrically at least in sections next to the second exhaust gas purification element. In each case one exhaust gas passage area, through which exhaust gas can flow and which is oriented, in particular, parallel to the projection plane, is further preferably arranged in each case in the region of the exhaust gas part flow duct, which region is arranged next to the exhaust gas purification element. Within the context of the invention, the exhaust gas passage area is to be understood to mean the cross-sectional area, through which exhaust gas can flow, in particular orthogonally with respect to the flow direction of the exhaust gas.

The first and the second exhaust gas part flow duct are preferably arranged in an intermediate space between a first and a second imaginary tangential plane. The first tangential plane is preferably tangent to at least one of the exhaust gas purification elements from one side, and the second tangential plane is tangent with the exhaust gas purification element from the opposite side. The first and the second tangential planes are preferably oriented parallel to one another and orthogonally with respect to the projection plane.

A part flow duct axis (this is to be interpreted as an imaginary straight line which is oriented orthogonally with respect to the projection plane) further preferably penetrates both the first and the second exhaust gas passage areas. A particularly space-saving construction of the exhaust gas purification system can be achieved, in particular, by way of a configuration of this type of the exhaust gas part flow ducts with respect to one another and with respect to the exhaust gas purification elements.

Visually, the first and the second exhaust gas part flow ducts are arranged on the same side of the exhaust gas purification elements, and a particularly space-saving construction can be achieved as a result.

In one preferred embodiment, the first exhaust gas purification element and the second exhaust gas purification element have at least substantially the same flow resistance. The first exhaust gas passage area and the second exhaust gas passage area further preferably have at least substantially the same area. The first exhaust gas passage area and the second exhaust gas passage area are further preferably identical to one another. A particularly low flow resistance for the exhaust gas purification system can be achieved, in particular, by way of a configuration of this type.

In one preferred embodiment, an exhaust gas guiding device is arranged downstream between the exhaust gas outlet area of the first exhaust gas purification element and the exhaust gas inlet area of the second exhaust gas purification element. The exhaust gas guiding device is preferably set up to guide the first part exhaust gas flow which exits from the exhaust gas outlet area of the first exhaust gas purification element into the second exhaust gas part flow duct. The exhaust gas guiding device is further preferably set up to guide the second part exhaust gas flow which flows through the first exhaust gas part flow duct to the exhaust gas inlet area of the second exhaust gas purification element. The exhaust gas guiding device is further preferably configured as a sheet metal component which is, in particular, thin-walled, the first part exhaust gas flow flowing on one side of the sheet metal component, and the second part exhaust gas flow flowing on the side which lies opposite the side. Tests have shown that the flow behavior can be improved geometrically between the first and the second exhaust gas purification elements, in particular, by way of an exhaust gas guiding device of this type.

In a further preferred embodiment, the exhaust gas purification system has an exhaust gas system housing. The exhaust gas system housing preferably surrounds the first exhaust gas purification element or the second exhaust gas purification element or the two exhaust gas purification elements at least partially or preferably completely. The exhaust gas guiding device is preferably arranged within the exhaust gas system housing, and the exhaust gas guiding device is preferably connected to the exhaust gas system housing, and is particularly preferably connected to it in an integrally joined manner. The exhaust gas guiding device preferably closes off the exhaust gas inlet area of the second exhaust gas purification element together with the exhaust gas system housing in a fluid-tight manner with respect to the exhaust gas outlet area of the first exhaust gas purification element. In particular, the exhaust gas guiding device therefore results in two paths through the exhaust gas purification system which are separated from one another fluidically or in flow terms, and, in particular, the flow resistance can be lowered as a result.

In one particularly preferred embodiment of the invention, the exhaust gas guiding device is configured as a sheet metal bent part, in particular a three-dimensionally shaped sheet metal bent part.

In one preferred embodiment of the invention, the first exhaust gas purification element or the second exhaust gas purification element or the two exhaust gas purification elements is/are configured as an exhaust gas particulate filter. The quantity of particles within the exhaust gas flow which is output by the internal combustion engine can be reduced, in particular, by way of at least one exhaust gas particulate filter.

In one preferred embodiment of the invention, the first exhaust gas purification element or the second exhaust gas purification element or the two exhaust gas purification elements is/are configured as an exhaust gas catalytic converter. An exhaust gas catalytic converter is preferably to be understood to mean a device for converting, in particular, noxious constituents of the exhaust gases of the internal combustion engine into less noxious substances. Exhaust gas catalytic converters of this type are known from the prior art, in particular as oxidation catalytic converters. One embodiment of the exhaust gas purification system further preferably has at least one exhaust gas particulate filter and at least one exhaust gas catalytic converter.

In one preferred embodiment, the exhaust gas purification system has an exhaust gas flow manifold. An exhaust gas flow manifold of this type preferably has an exhaust gas outflow opening. Here, the exhaust gas outflow opening is set up, in particular, in such a way that an exhaust gas flow can flow out of the exhaust gas purification system through the exhaust gas outflow opening. The entire exhaust gas flow which is fed to the exhaust gas purification system further preferably flows through the exhaust gas outflow opening out of the exhaust gas purification system. The exhaust gas flow manifold further preferably connects the second exhaust gas part flow duct and an exhaust gas outlet area of the second exhaust gas purification element in a fluid-conducting manner to the exhaust gas outflow opening.

In one preferred embodiment, the exhaust gas purification system has an exhaust gas flow divider. The exhaust gas flow divider preferably has an exhaust gas inlet opening. Here, the exhaust gas inlet opening is preferably set up such that an exhaust gas flow which is output by the internal combustion engine can enter through the exhaust gas inlet opening into the exhaust gas purification system. The exhaust gas flow divider preferably connects the first exhaust gas part flow duct and an exhaust gas inlet area of the first exhaust gas purification element in a fluid-conducting manner to the exhaust gas inlet opening.

The exhaust gas flow divider or the exhaust gas flow manifold or both is/are preferably configured at least partially or completely as a sheet metal component.

In a further preferred embodiment, the exhaust gas flow divider or the exhaust gas flow manifold or both is/are connected in an integrally joined manner to the exhaust gas system housing. An integrally joined connection of this type can preferably be produced by way of a welding method. The exhaust gas flow manifold or the exhaust gas flow divider or both is/are further preferably configured in one piece with the exhaust gas system housing. A fluid-tight connection of the components among one another can thus be produced, in particular, by way of an integrally joined connection.

In one preferred embodiment, the first exhaust gas part flow duct or the second exhaust gas part flow duct or the two exhaust gas part flow ducts is/are delimited at least in sections or completely by the exhaust gas system housing and by the exhaust gas guiding device. A boundary of this type further preferably lies, in particular, in that region of one of the exhaust gas part flow ducts, in which the exhaust gas part flow ducts are arranged next to or parallel to one of the exhaust gas purification elements.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
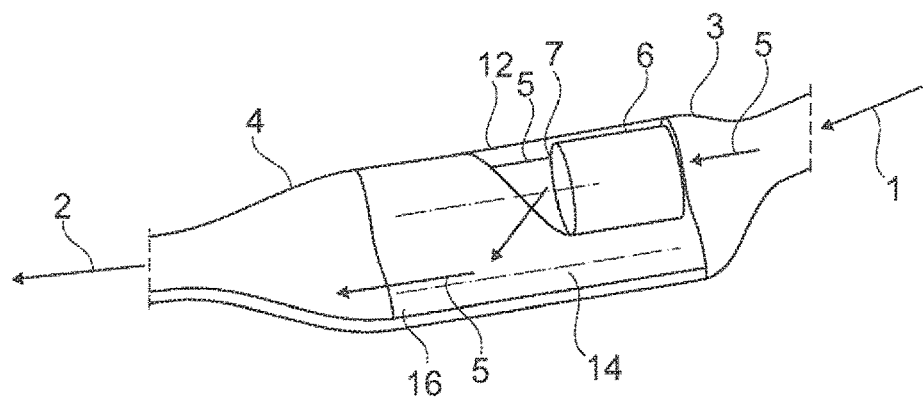
FIG. 1 shows a perspective sectional illustration of an exhaust gas purification system, in which the path of a first part exhaust gas flow is illustrated.

FIG. 1 shows an exhaust gas purification system; here, an exhaust gas flow 1 from an internal combustion engine enters into it and leaves the exhaust gas purification system as a purified exhaust gas flow 2. The upper half of the exhaust gas system housing 12 is shown in a semitransparent way and therefore reveals a view of the first exhaust gas purification element 6.

The first part exhaust gas flow 5 flows through the first exhaust gas purification element 6. The first part exhaust gas flow 5 is guided by way of the exhaust gas guiding device 14 around the second exhaust gas purification element (not shown). Here, the first part exhaust gas flow 5 flows through the second exhaust gas part flow duct 16 which is arranged next to the second exhaust gas purification element. The unpurified exhaust gas flow 1 from the internal combustion engine enters via the exhaust gas flow divider 3 into the exhaust gas purification system. In the exhaust gas flow divider 3, the unpurified exhaust gas flow 1 is divided into a first part exhaust gas flow 5 and into a second part exhaust gas flow. The purified exhaust gas flow 2 exits from the exhaust gas purification system through the exhaust gas flow manifold 4, in which the two part exhaust gas flows are combined again.

Figure 2:
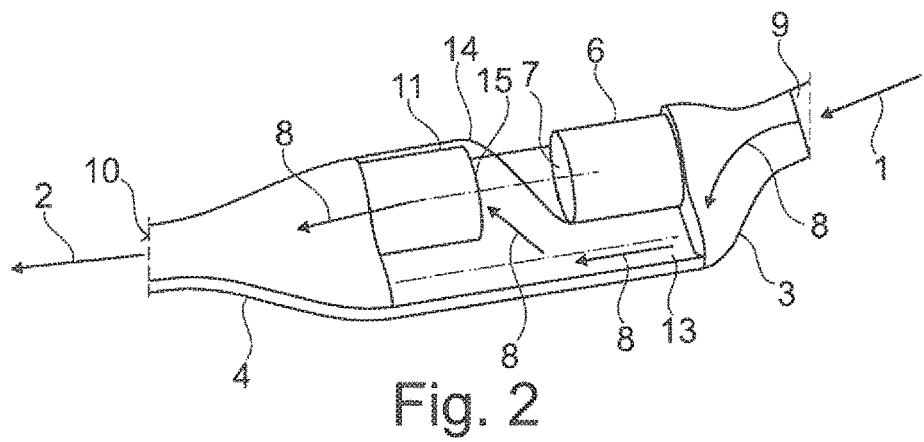
FIG. 2 shows a perspective sectional illustration of an exhaust gas purification system, in which the path of a second part exhaust gas flow is illustrated.

FIG. 2 shows an exhaust gas purification system as known from FIG. 1. Here, the upper half of the exhaust gas system housing 12 is not shown, and the exhaust gas guiding device 14 is shown in a semitransparent manner, with the result that the first exhaust gas purification element 6 and the second exhaust gas purification element 11 can then be seen. The first part exhaust gas flow 5 is not shown in FIG. 2 for the sake of clarity. The second part exhaust gas flow 8 is guided past the first exhaust gas purification element 6 through the first exhaust gas part flow duct 13 which is arranged next to the first exhaust gas purification element 6, and is guided to the second exhaust gas purification element 11 by way of the exhaust gas guiding device 14. Here, the two exhaust gas purification elements 6, 11 are arranged geometrically behind one another and are flowed through in parallel by the two part exhaust gas flows 5, 8 in flow terms.

The unpurified exhaust gas flow 1 enters into the exhaust gas flow divider 3 through the exhaust gas inlet area 9, and the purified exhaust gas flow 2 leaves the exhaust gas flow manifold 4 through the exhaust gas outflow opening 10. In this way, the exhaust gas guiding device 14 together with the exhaust gas system housing 12 connects the exhaust gas outlet area 7 of the first exhaust gas purification element 6 to the exhaust gas part flow duct 16, and connects the exhaust gas inlet area 15 of the second exhaust gas purification element 11 to the first exhaust gas part flow duct 13.

Figure 3:
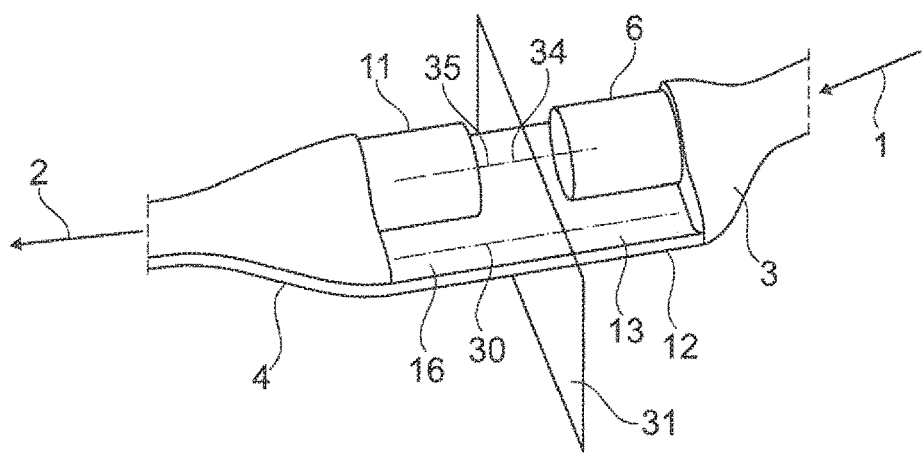
FIG. 3 shows a perspective sectional illustration of an exhaust gas purification system without an exhaust gas guiding device.

FIG. 3 shows the same exhaust gas purification system as in FIGS. 1 and 2, but only the lower half of the exhaust gas system housing 12 is shown; the upper half of the exhaust gas system housing and the exhaust gas guiding device 14 are hidden. The projection plane 31 is arranged orthogonally with respect to the longitudinal axis 35. Here, the longitudinal axis 35 is the longitudinal axis of the first exhaust gas purification element 6 and the second exhaust gas purification element 11. The longitudinal axis 35 has a penetration point 34 in the projection plane 31. The axis 30 runs through the first exhaust gas part flow duct 13 and through the second exhaust gas part flow duct 16 and is oriented in an axially parallel manner with respect to the longitudinal axis 35 but incongruently with respect to the latter, with the result that the exhaust gas part flow ducts 13, 16 are arranged geometrically next to the exhaust gas purification elements 6, 11.

Figure 4:
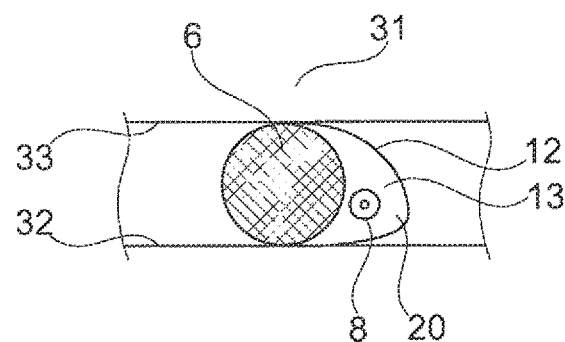
FIG. 4 shows a sectional illustration in the projection plane.

FIG. 4 shows a cross-sectional view of the exhaust gas purification system. Here, the first exhaust gas purification element 6 is surrounded by the exhaust gas system housing 12. Furthermore, the first exhaust gas part flow duct 13 is surrounded by the housing 12 and has a first exhaust gas passage area 20, through which the first part exhaust gas flow 8 can flow. The first tangential plane 33 and the second tangential plane 32 are arranged tangentially with respect to the first exhaust gas purification element 6. The two tangential planes 33, 32 are oriented in parallel with one another and orthogonally with respect to the projection plane 31 (=illustration planes). Furthermore, both the first exhaust gas part flow duct 13 and the second exhaust gas part flow duct (not shown) are arranged within the intermediate space between the tangential planes.

Figure 5:
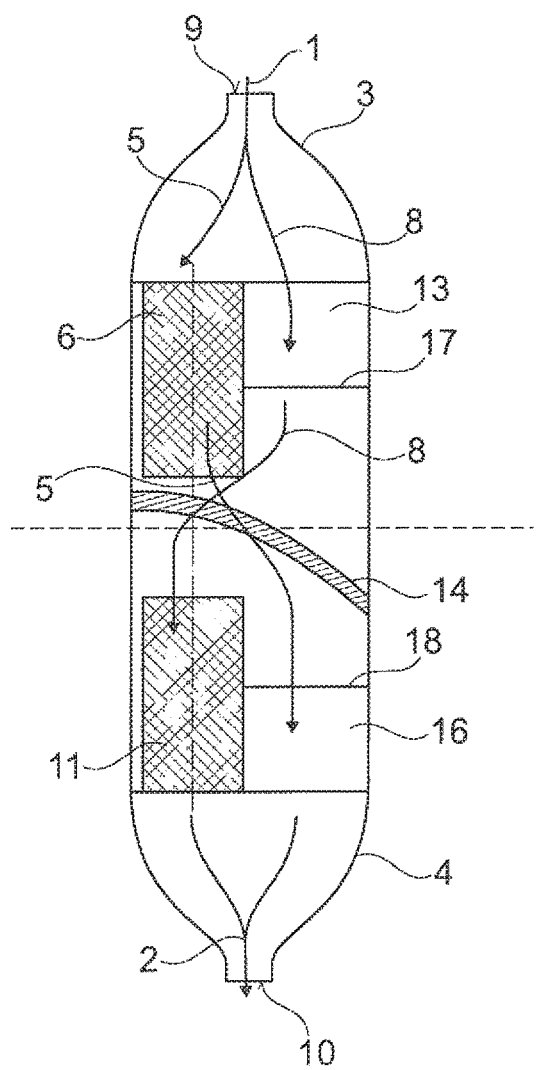
FIG. 5 shows a longitudinal sectional illustration in plan view.

FIG. 5 shows a sectional illustration in a plan view of the exhaust gas purification system, in order to describe the paths of the exhaust gas flow through the exhaust gas purification system in greater detail. The unpurified exhaust gas flow 1 enters through the exhaust gas inlet opening 9 into the exhaust gas flow divider 3, and is divided there into the first part exhaust gas flow 5 and the second part exhaust gas flow 8.

The first part exhaust gas flow 5 first of all flows through the first exhaust gas purification element 6 and, after it has left the latter and is purified, is guided by way of the exhaust gas guiding device 14 into the second exhaust gas part flow duct 16. The second exhaust gas part flow duct 16 has an exhaust gas passage area 18, through which the first part exhaust gas flow 5 can flow.

The second part exhaust gas flow 8 first of all enters into the first exhaust gas part flow duct 13; the latter has a further exhaust gas passage area 17, through which exhaust gas can flow. By way of the exhaust gas guiding device 14, the second part exhaust gas flow 8 is fed to the second exhaust gas purification element 11 and is purified by way of the latter when flowing through it.

After exiting from the second exhaust gas purification element 11, the first and the second part exhaust gas flow 5, 8 are combined in the exhaust gas flow manifold 4, and leave the exhaust gas purification system through the exhaust gas outflow opening 10 as a purified exhaust gas flow 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas purification system for an internal combustion engine of a motor vehicle, comprising:
    a first exhaust gas purification element through which exhaust gas can flow;
    a second exhaust gas purification element which is connected in flow terms in parallel with the first exhaust gas purification element and through which exhaust gas can flow;
    a first exhaust gas part flow duct which is connected in flow terms in parallel with the first exhaust gas purification element; and
    a second exhaust gas part flow duct which is connected in flow terms in parallel with the second exhaust gas purification element;
    wherein the second exhaust gas purification element is disposed geometrically behind the first exhaust gas purification element;
    wherein a perpendicular projection of an exhaust gas outlet area of the first exhaust gas purification element onto a projection plane, which is penetrated orthogonally by a longitudinal axis of the first exhaust gas purification element, is covered at least partially by a perpendicular projection of an exhaust gas inlet area of the second exhaust gas purification element onto the projection plane;
    wherein the first exhaust gas part flow duct has a first exhaust gas passage area, through which exhaust gas can flow, wherein the second exhaust gas part flow duct has a second exhaust gas passage area, through which exhaust gas can flow, wherein the first and the second exhaust gas passage areas are oriented parallel to the projection plane, and wherein the first and the second exhaust gas part flow ducts are disposed geometrically behind one another;
    wherein the first and the second exhaust gas part flow ducts are disposed such that a part flow duct axis, which is orthogonal with respect to the projection plane, passes through the first and the second exhaust gas passage areas.

2. The exhaust gas purification system as claimed in claim 1, wherein the first exhaust gas purification element and the second exhaust gas purification element have at least substantially a same flow resistance and wherein the first and the second exhaust gas passage areas have at least substantially a same area.

3. The exhaust gas purification system as claimed in claim 1, further comprising an exhaust gas guiding device that is disposed between the exhaust gas outlet area of the first exhaust gas purification element and the exhaust gas inlet area of the second exhaust gas purification element, wherein the exhaust gas guiding device guides an exhaust gas flow which exits from the exhaust gas outlet area of the first exhaust gas purification element into the second exhaust gas part flow duct and guides an exhaust gas flow which flows through the first exhaust gas part flow duct to the exhaust gas inlet area of the second exhaust gas purification element.

4. The exhaust gas purification system as claimed in claim 3, wherein the exhaust gas guiding device together with an exhaust gas system housing, which surrounds the first and the second exhaust gas purification elements, closes off the exhaust gas inlet area of the second exhaust gas purification element in a fluid-tight manner with respect to the exhaust gas outlet area of the first exhaust gas purification element.

5. The exhaust gas purification system as claimed in claim 3, wherein the exhaust gas guiding device is a sheet metal bent part.

6. The exhaust gas purification system as claimed in claim 4, wherein the exhaust gas guiding device is a sheet metal bent part.

7. The exhaust gas purification system as claimed in claim 1, wherein the first exhaust gas purification element and/or the second exhaust gas purification is an exhaust gas particulate filter.

8. The exhaust gas purification system as claimed in claim 1, wherein the first exhaust gas purification element and/or the second exhaust gas purification element is an exhaust gas catalytic converter.

9. The exhaust gas purification system as claimed in claim 1, further comprising an exhaust gas flow manifold, wherein the exhaust gas flow manifold has an exhaust gas outflow opening through which an exhaust gas flow is flowable out of the exhaust gas purification system and wherein the exhaust gas flow manifold connects the second exhaust gas part flow duct and an exhaust gas outlet area of the second exhaust gas purification element in a fluid-conducting manner to the exhaust gas outflow opening.

10. The exhaust gas purification system as claimed in claim 1, further comprising an exhaust gas flow divider, wherein the exhaust gas flow divider has an exhaust gas inlet opening through which an exhaust gas flow enters into the exhaust gas purification system and wherein the exhaust gas flow divider connects the first exhaust gas part flow duct and an exhaust gas inlet area of the first exhaust gas purification element in a fluid-conducting manner to the exhaust gas inlet opening.

11. The exhaust gas purification system as claimed in claim 9, wherein the exhaust gas flow manifold is a sheet metal component.

12. The exhaust gas purification system as claimed in claim 10, wherein the exhaust gas flow divider is a sheet metal component.

13. The exhaust gas purification system as claimed in claim 9, wherein the exhaust gas flow manifold is connected in an integrally joined manner to an exhaust gas system housing.

14. The exhaust gas purification system as claimed in claim 10, wherein the exhaust gas flow divider is connected in an integrally joined manner to an exhaust gas system housing.

15. The exhaust gas purification system as claimed in claim 3, wherein the first exhaust gas part flow duct and/or the second exhaust gas part flow duct is delimited at least in sections or completely by an exhaust gas system housing and the exhaust gas guiding device.

* * * * *